United States Patent
Ishikawa et al.

(10) Patent No.: US 9,114,464 B1
(45) Date of Patent: Aug. 25, 2015

(54) FIXTURE FOR SUBSTRATE CUTTING

(75) Inventors: David Ishikawa, Mountain View, CA (US); Laila Mattos, Palo Alto, CA (US)

(73) Assignee: Alta Devices, Inc., Santa Clara, CA (US)

(*) Notice: Subject to any disclaimer, the term of this patent is extended or adjusted under 35 U.S.C. 154(b) by 573 days.

(21) Appl. No.: 13/420,414

(22) Filed: Mar. 14, 2012

(51) Int. Cl.
*B26F 1/02* (2006.01)
*B21D 22/00* (2006.01)
*H05K 13/02* (2006.01)
*B23D 23/00* (2006.01)
*B26D 7/32* (2006.01)

(52) U.S. Cl.
CPC .. *B23D 23/00* (2013.01); *B26D 7/32* (2013.01)

(58) Field of Classification Search
USPC .......... 83/454, 278, 214, 255, 228, 271, 405; 29/546.3, 566.2, 564.6, 335, 564.8, 29/565, 566; 140/105; 72/350, 456, 448, 72/455, 446, 482.6–482.9, 482.93, 482.94
See application file for complete search history.

(56) References Cited

U.S. PATENT DOCUMENTS

| | | | |
|---|---|---|---|
| 2,559,434 A * | 7/1951 | Hyland | 33/549 |
| 2,611,434 A * | 9/1952 | Mugler | 83/171 |
| 3,911,716 A | 10/1975 | Weglin | |
| 4,742,746 A * | 5/1988 | Olsson | 83/387 |
| 6,182,357 B1 | 2/2001 | Chen et al. | |
| 8,490,456 B2 * | 7/2013 | Wang et al. | 72/350 |
| 2010/0001316 A1 | 1/2010 | Gmitter et al. | |
| 2011/0056304 A1 | 3/2011 | Hsueh et al. | |

* cited by examiner

*Primary Examiner* — Ghassem Alie
(74) *Attorney, Agent, or Firm* — Thomas Schneck

(57) ABSTRACT

A fixture for cutting thin substrates, such as films, wafers, semiconductor layers and the like, using a blade holder assembly joined to a substrate clamp assembly. Each assembly has a plurality of members with the substrate clamp having a base plate that introduces a vacuum environment and a substrate support plate that uses the vacuum to secure the substrate in place. The blade holder assembly has interlocking projections in interleaving sheet members sandwiched between two bracket members that define slots for supporting a knife. Multiple slots allow the blade to be positioned in different positions and different orientations for cutting thin substrates held with vacuum pressure in the substrate clamp assembly.

6 Claims, 6 Drawing Sheets

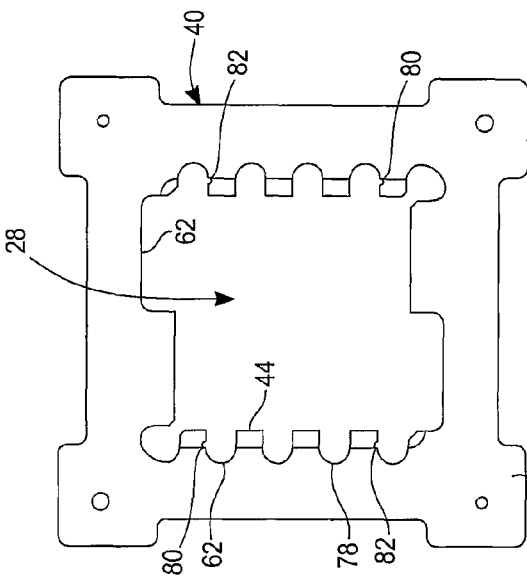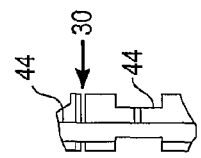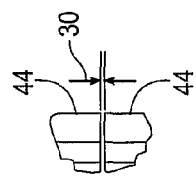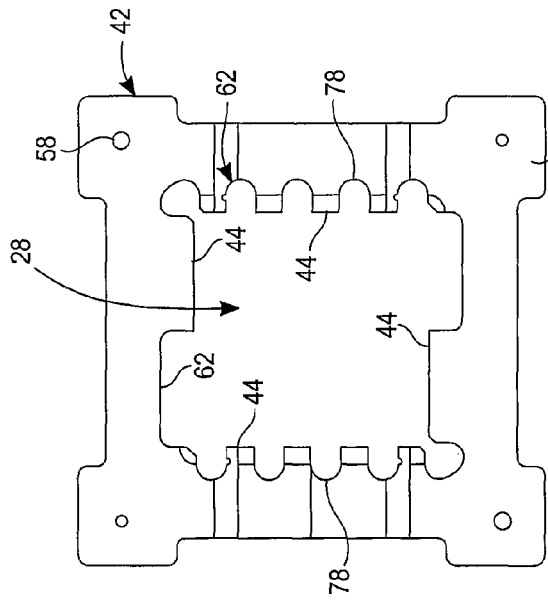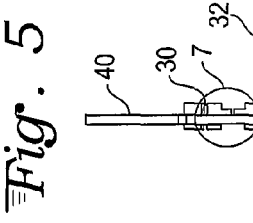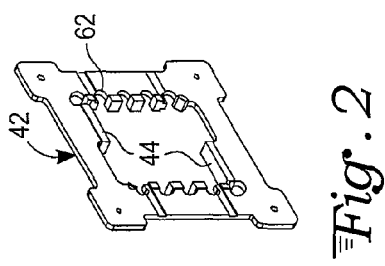

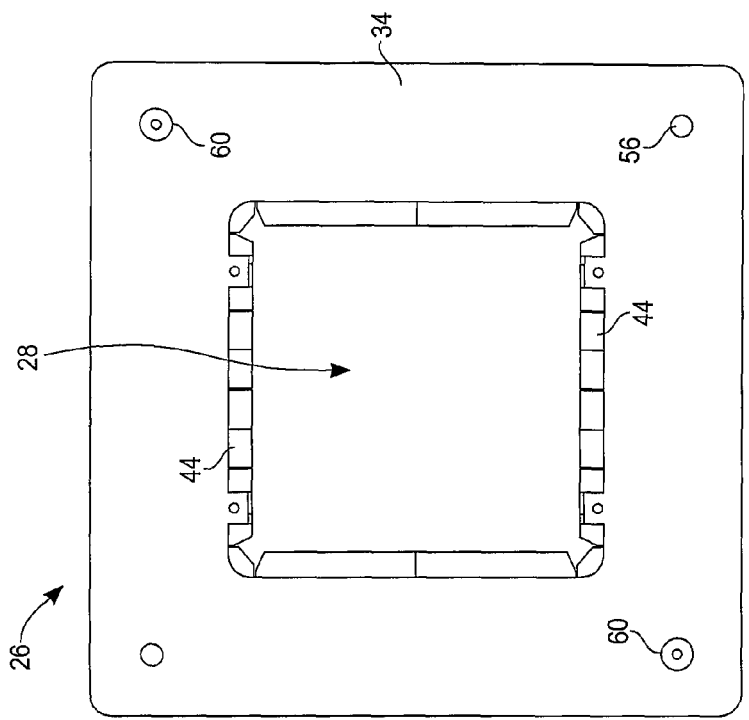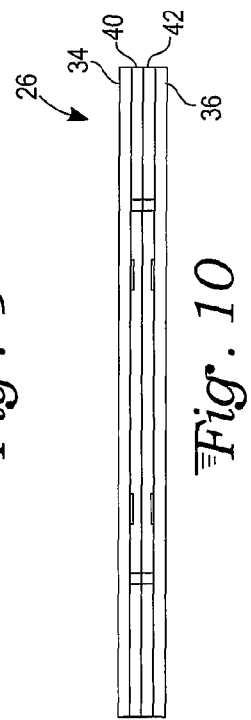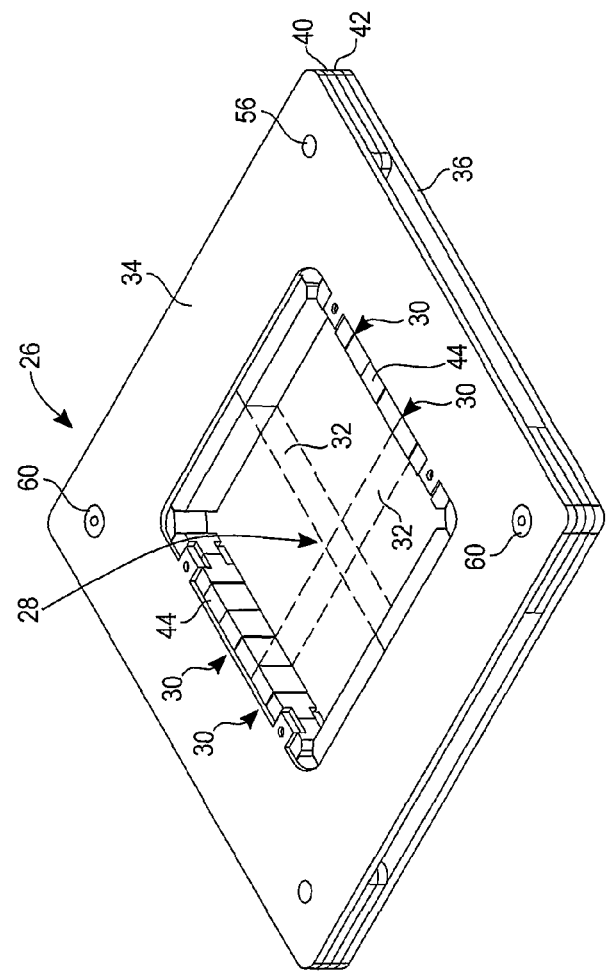

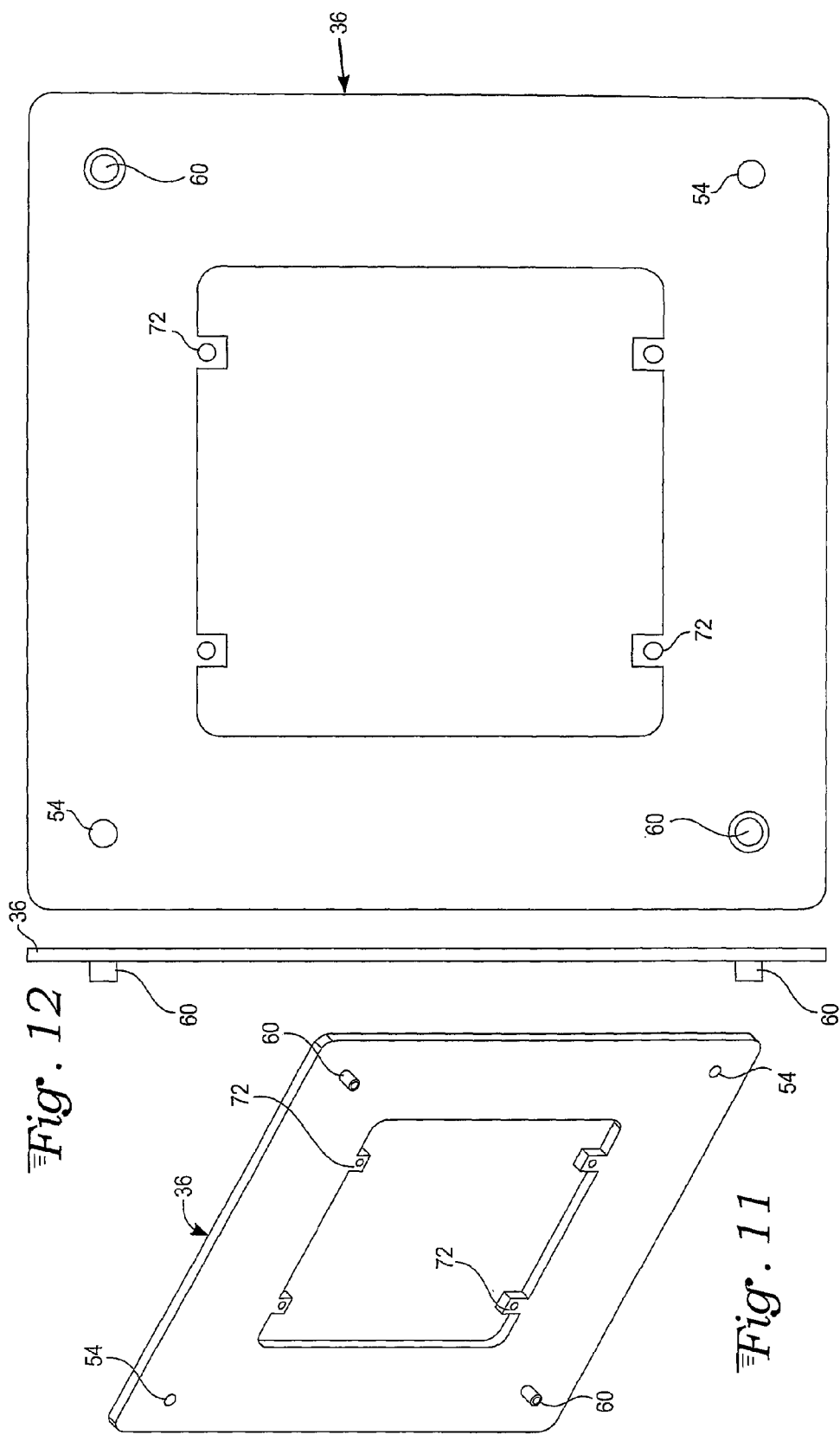

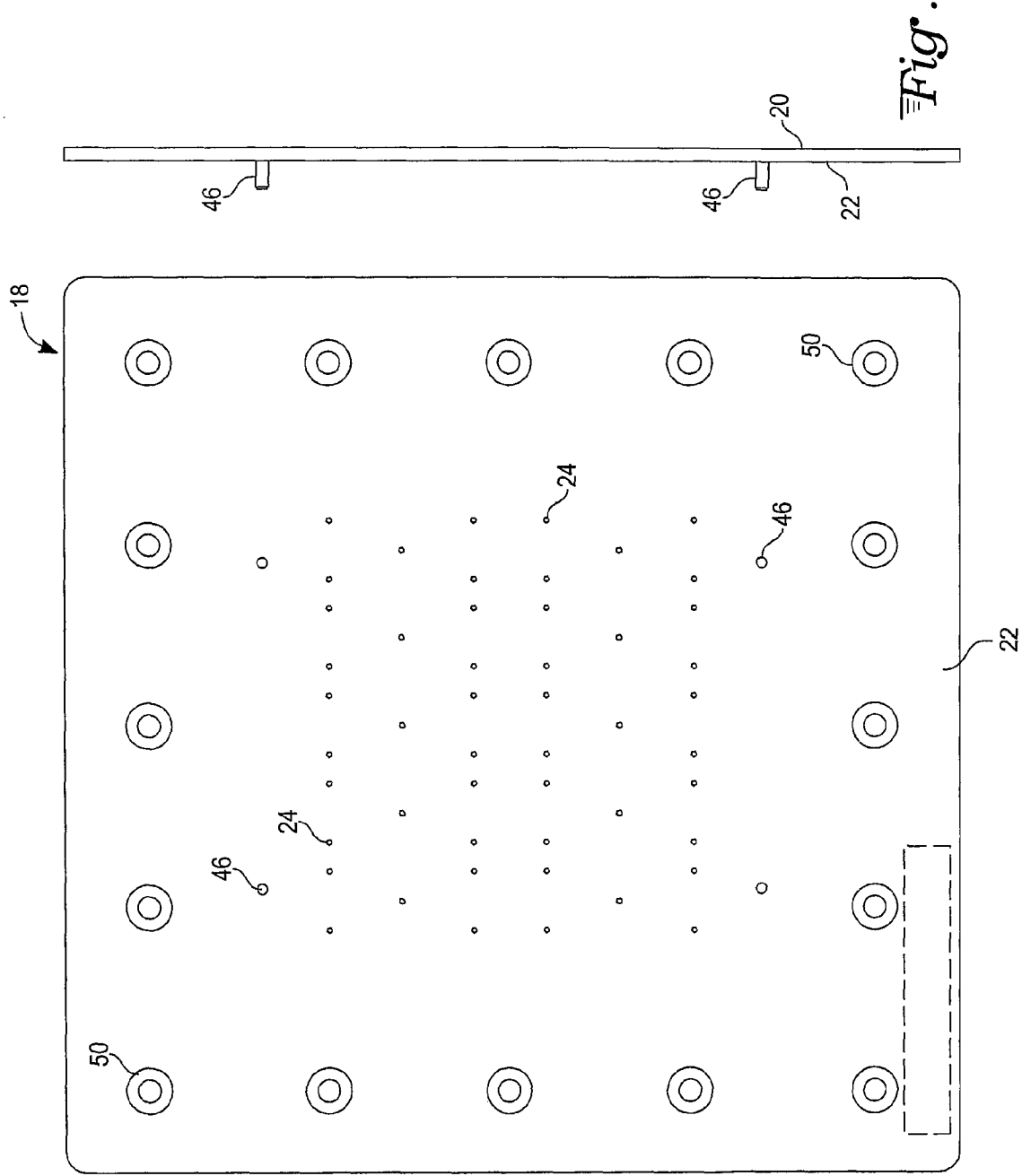

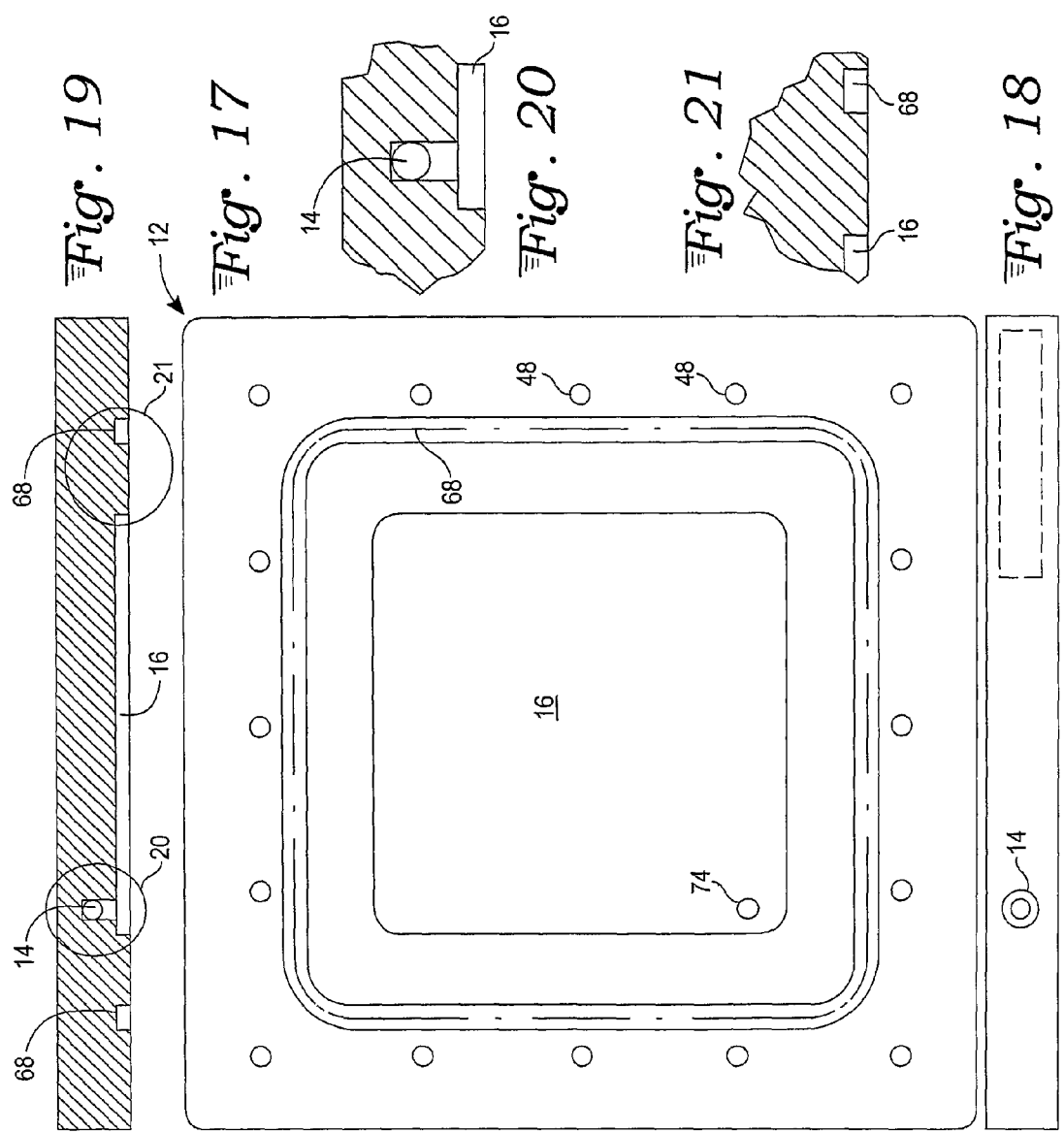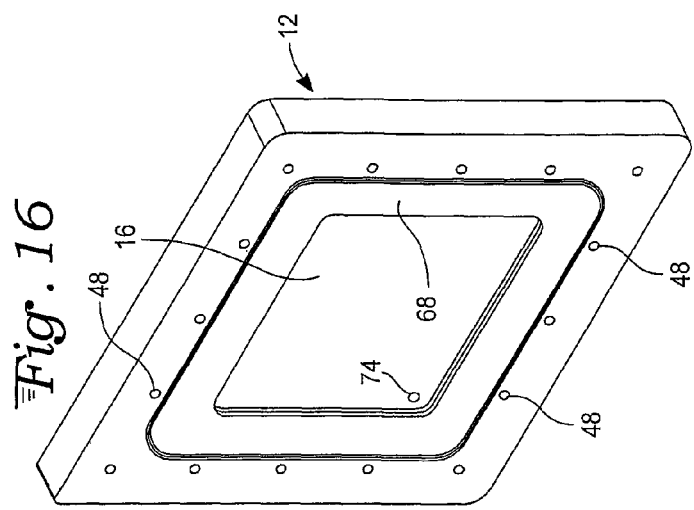

FIXTURE FOR SUBSTRATE CUTTING

TECHNICAL FIELD

The invention relates to cutting implements for substrates such as thin films and foils, and, in particular, to a fixture for guiding a movable cutting blade.

BACKGROUND ART

In microelectronics, semiconductor wafers, thin films and foils are often cut with diamond saws. A problem with such cutting is that the saw removes material at a kerf, thereby diminishing the overall amount of material. Where the overall amount of material is useful in performance of an electronic function, or very valuable due to chemical composition or fabrication difficulty, the removed material constitutes significant loss. Another problem is that a saw generates particles that must be captured or removed in order to prevent contamination of active surfaces.

An alternative to sawing is cutting by means of a die or blade. In the prior art, a sharp die has been used to engage a thin substrate such as a foil, for example carrying a circuit pattern, by pressing the foil into an underlying support to cut the desired circuit pattern from the foil. One of the problems with dies is that to achieve regularity of the cut, the die must be pressed through the foil into a substrate since force for separation is essentially vertical, thereby bending the foil where such pressing occurs. Bending causes slippage of crystal structures, affecting electronic properties and is therefore deleterious. Sometimes dies have been used to cut foil without pressing into a substrate but such dies must be kept very sharp over a uniform area to be effective.

Blade shearing has been used for separating flat or nearly flat thin substrates. Blade shearing is advantageous in that there is minimal material loss due to kerf marks and tearing. However, dicing yield and throughput can be adversely affected by human error when the thin substrate is manually visually aligned to the blade before shearing.

Also, thin foils are not always flat and can have a spring-like resiliency that causes uncut and cut sections to roll or bow independently thus compromising foil dicing accuracy.

An objective of the invention is to cut thin substrates without deformation and without loss of material.

Another objective of the invention is to make precise, reproducible cuts in thin substrates.

SUMMARY

The above objectives have been met with a fixture including a blade holder assembly supporting one or more blades, with the blade holder assembly joined to a substrate clamp. The substrate comprises, for example, but is not limited to, a thin foil, a semiconductor wafer, layers of semiconductors, or a thin foil with layers of semiconductors deposited thereon comprising solar cells. The substrate clamp has a base plate associated with a vacuum pump that establishes a central vacuum plenum, acting as one member of the clamp. The base plate communicates the vacuum environment to a stiff thin substrate support plate that has a plurality of small vacuum ports arranged in a pattern for securing a thin substrate that is placed on the support plate in a known location, similar to a vacuum chuck used in semiconductor manufacturing for securing wafers on supports for semiconductor processing or inspection. The stiffness of the support plate helps to prevents thin substrate deformation as does the tautness of the thin substrate which is pulled by the vacuum.

A second member of the fixture is a blade holder assembly that presses upon the thin substrate. The blade holder assembly has a central open area with slots surrounding the open area for guiding one or more blades. The blade holder assembly has a sandwich construction with the outer members being brackets that exert pressure on inner members having protrusions with slots that accommodate blades. Each inner member includes an inwardly facing surface of protrusions or convolutions including offset diagonally symmetric blade guide indentations, such as crenations, alternating between and sharing surfaces with adjacent blade guide projections, which when blade guide projections of one inner member are pressed together with opposing indentations of another inner member, in an interleaving relationship, define blade guiding slots in the areas of the indentions unoccupied by the blade guide projections received in the indentations. In one example, the slots may be as narrow as 0.040 inches allowing for high precision reproducible cutting. Using two diagonally symmetric interleaving inner members to define slot locations insures the accuracy of slot positioning since the convolutions of the two inner members must be aligned in order to be pressed together. Blades supported in slots at blade edges span selected linear target regions of the thin substrate through the central open area of the blade holder. In one example, the alignment of the slots relative to the secured thin substrate is such that the blade extends slightly beyond the thin substrate edge when it is moved through the slot to cut the thin substrate thus ensuring a clean cut across the entire span of the thin substrate.

BRIEF DESCRIPTION OF THE DRAWINGS

FIG. 2 is a perspective view of a first sheet of FIG. 1.
FIG. 3 is a top plan view of the sheet of FIG. 2.
FIG. 4 is a top plan view of a second sheet of FIG. 1.
FIG. 5 is a partial top view of first and second sheets of FIGS. 3 and 4 mated.
FIG. 6 is a magnified partial view of FIG. 5.
FIG. 7 is another magnified partial view of FIG. 5.
FIG. 8 is a perspective view of the sheath of the present invention.
FIG. 9 is a top plan view of the sheath of FIG. 8.
FIG. 10 is a front plan view of the sheath of FIG. 9.
FIG. 11 is a perspective view of a bracket of the blade assembly of FIG. 1.
FIG. 12 is a side plan view of the bracket of FIG. 11.
FIG. 13 is a top plan view of the bracket of FIG. 12.
FIG. 14 is a top plan view of the thin substrate support plate of FIG. 1.
FIG. 15 is a side plan view of the thin substrate support plate of FIG. 14.
FIG. 16 is a perspective view of the base plate of FIG. 1.
FIG. 17 is a top plan view of the base plate of FIG. 16.
FIG. 18 is a front plan view of the base plate of FIG. 17.
FIG. 19 is a sectional view of FIG. 18.
FIG. 20 is a magnified partial view of FIG. 19.
FIG. 21 is another magnified partial view of FIG. 19.

DETAILED DESCRIPTION

Figure 1:
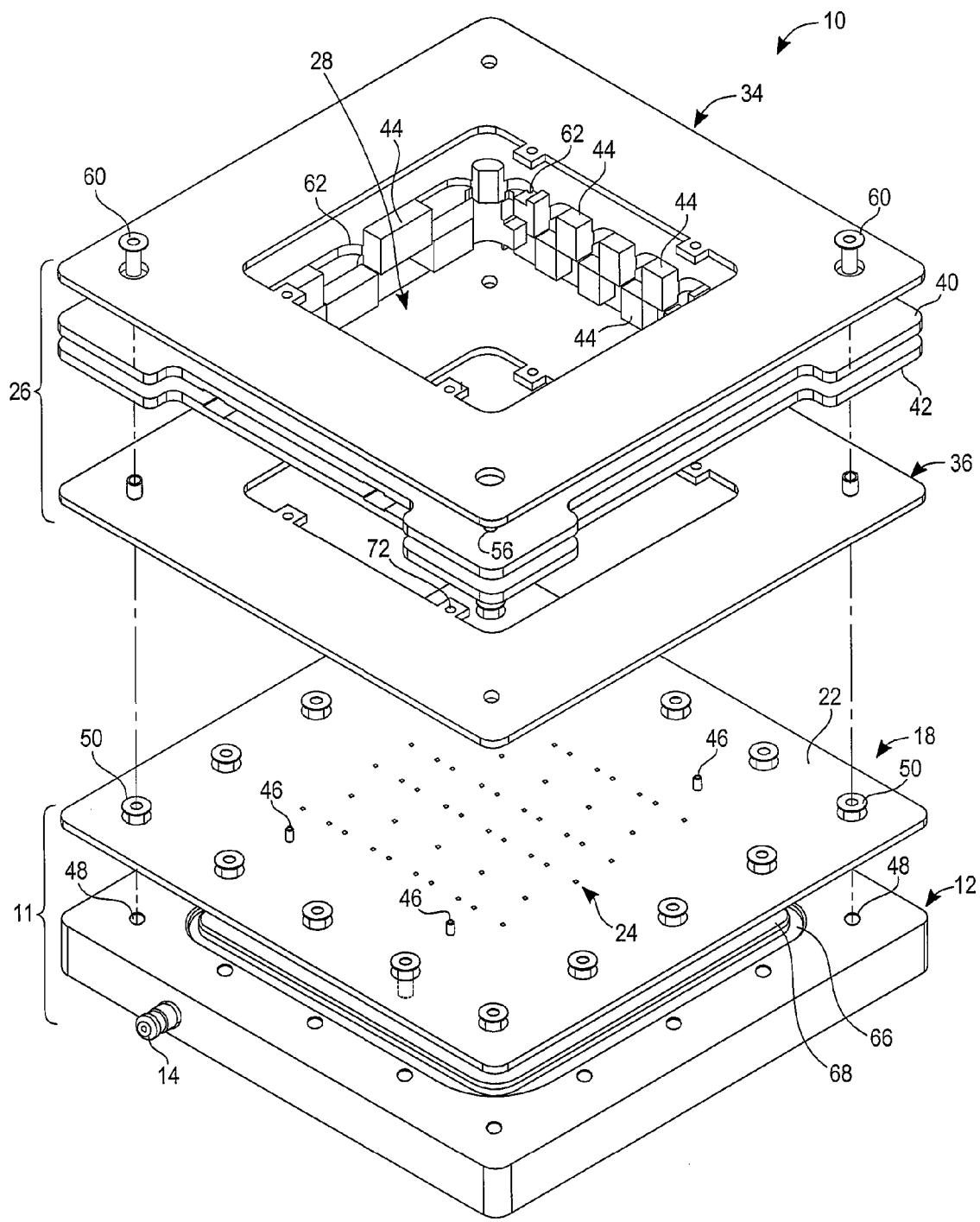
FIG. 1 is an exploded view of the fixture of the present invention.

With reference to FIG. 1, a fixture 10 for cutting thin substrates is seen. The fixture is intended to support a thin stiff rectangular blade that fits in slots or grooves within the fixture. There are two major assemblies that fit together to form fixture 10. One is a substrate clamp 11 and the other is a blade holder assembly 26, with both assemblies being joined together by fasteners, such as fasteners 50, 60.

The substrate clamp 11 includes a base plate 12 and a substrate support plate 18 that rests upon the base plate. The base plate has a vacuum pump port 14 for attaching a line to a vacuum pump. Internal channels communicate a vacuum environment to a plenum defined in the upper surface of the base plate, resembling a pan, with the plenum being the interior of the pan. The vacuum plenum is circumferentially isolated by an o-ring 68 that fits into an o-ring depression 66 in the base plate 12.

The substrate support plate 18 has opposed major surfaces, with one surface facing the vacuum plenum of the base plate 12 and the opposite surface 22 having an array of vacuum ports 24 that secure a substrate placed on the support plate, but not shown. The object held in place may be a thin foil, a wafer, layers of semiconductors in a laminar sheet, or a thin foil with layers of semiconductors forming solar cells, all termed "substrate" hereafter. The object placed on the substrate clamp is to be cut or diced into smaller pieces. The support plate is stiff so that the substrate placed on its surface will not warp nor flex. Index pins 46 assist with registration of the substrate on the surface, while holes 50 in the support plate 18 are aligned with similar holes 48 in the base plate for securing base plate 12 to support plate 18, as well as being aligned with holes 60 in the blade holder assembly 26.

Blade holder assembly 26 has a sandwich construction involving spaced apart bracket members 34 and 36 that exert pressure from opposed sides upon inner sheet members 40 and 42. The two inner sheet members provide inwardly facing protrusions or convolutions 62, offset diagonally on opposite inner peripheral sides of the open area 28 of each sheet member to form blade guide slots sharing surfaces with adjacent blade guide projections 44 when the two inner sheet members are pressed together. Indentations or crenations between projections of different sheet members allows for interleaving of sheets when pressed together.

With reference to FIGS. 2 and 3, a single sheet member 42 is seen with protrusions or convolutions 62 and blade guide projections 44. Crenations 78 are recesses that allow blade guide projections 44 to contact and support blade ends without excess friction. A central open area 28 allows inspection of a substrate being cut and provides open space for blade movement. Projections on one side of the sheet member are diagonally mirrored on an opposite side. This allows a flipped over sheet, as shown in FIG. 4 to have blade guide projections 44 in open area 28 that fit between blade guide projections of the adjacent sheet member. Small indentations 80, 82 in the crenations 62, 78 allow alignment of the two sheets 40, 42.

In the profile view of FIG. 5, projections 44 from two sides of a sheet will be side-by-side with slight gaps that form knife slots 30 between adjacent projections that will accommodate a knife or blade. FIGS. 6 and 7 show the slot 30 in the blade guide projections 44. When two sheets are stacked, the projections will interleave forming a wall with gaps for knife slots, as seen in FIG. 8. FIGS. 6 and 7 show how adjacent projections have slots 30 between blade guide projections 44.

FIGS. 8-10 show an entire blade holder assembly 26 with inner sheets 40 and 42 sandwiched between first and second brackets 34 and 36. Blade guide projections 44 are seen as closely spaced teeth with slots 30 between some projections. A central open area 28 is where knives, with ends supported between projections, are placed to cut the substrate. A knife is essentially a blade and is represented by dashed lines 32 in FIG. 8. The holes 56, 60 in corners of the sheets allow fastening to a substrate clamp member.

In FIGS. 11-13 a second bracket 36 is seen having a central open area with holes for connecting to other members, including holes 72 for connecting to a first bracket and fasteners 60 securing an entire blade holder assembly to a substrate clamp 11. Holes 54 similarly connect other members.

FIGS. 14 and 15 show details of substrate support plate 18 of the substrate clamp. Peripheral holes 50 are for fasteners that unite the support plate to the base plate, as well as fastening the blade holder assembly. Index pins 46 serve to locate a substrate in a desired location. Vacuum ports 24 apply vacuum to a substrate to maintain rigidity and fixed position.

FIGS. 16-19 show details of a base plate with a central vacuum plenum within depression 16. Vacuum port 14 applies vacuum pressure to the base plate through orifice 74 that is communicated internally to the central plenum. An o-ring in o-ring depression 68 preserves the vacuum environment in the plenum. Holes 48 in the base plate secure the base plate to the substrate support plate. The detail of FIG. 20 shows the vacuum pump port 14 communicating a vacuum environment to a portion of vacuum plenum 16. FIG. 18 shows a detail of o-ring depression 68 at a spaced distance from vacuum plenum 16 for preserving the vacuum environment.

In operation thin blades, approximately 0.035 inches thick fit in slots that are approximately 0.04 inches wide in the blade holder assembly. The blades have a width of abut 4.63 inches and span the open area of the blade holder assembly, in particular through the brackets 34 and 36, supported by the two sheet members hold between the brackets, with a sharpened tip that cuts just beyond the substrate edge. The blade is supported at its ends by the inwardly facing projections of the sheet members that define gaps where the blade is seated. Pressure on the blade achieves cutting of a substrate held in the substrate clamp assembly that is tightly fastened to the blade holder assembly.

What is claimed is:

1. A fixture for cutting thin substrates with a blade comprising:
    a thin substrate clamp; and
    a blade holder assembly disposed over the thin substrate clamp, the blade holder assembly having first and second sheets establishing a central open area over the thin substrate clamp and having inwardly facing blade guide members with slots formed therebetween surrounding the open area, opposed slots accommodating blades in selected planes perpendicular to a top surface of the first and second sheets, wherein first and second sheets have alternating inwardly facing blade guide projections and indentations with which surfaces are shared, said inwardly facing blade guide projections of one sheet occupying opposing indentations of the other sheet, wherein a slot comprises area in an indentation of one sheet disposed between an inwardly facing guide projection of one sheet and an inwardly facing blade guide projection of the other sheet occupying the indentation;
    whereby a thin substrate secured by the thin substrate clamp may be sheared along the selected plane by a blade moving in the selected plane toward the thin substrate.

2. The apparatus of claim 1 wherein the blade holder assembly comprises:
    first and second brackets each having a periphery surrounding the central open area wherein the first and second sheets are sandwiched by the brackets.

3. The apparatus of claim 1 wherein the thin substrate clamp is a vacuum chuck.

4. The apparatus of claim 1 wherein the thin substrate clamp comprises a thin substrate support plate having a lower surface communicating with the vacuum plenum and a planar upper surface having a plurality of vacuum ports arranged in a pattern for contact with a thin substrate disposed on the thin substrate support plate in a planar relation secured by the vacuum ports.

5. The apparatus of claim 1 wherein said indentations are diagonally symmetric.

6. The apparatus of claim 1 wherein the selected plane along which the blade moves is disposed to extend past the thin substrate.

\* \* \* \* \*